US 010951650 B2

United States Patent
Boutnaru

(10) Patent No.: US 10,951,650 B2
(45) Date of Patent: Mar. 16, 2021

(54) DETECTION OF NETWORK SNIFFING ACTIVITY

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

(*) Notice: Subject to any disclaimer, the term of this patent is extended or adjusted under 35 U.S.C. 154(b) by 431 days.

(21) Appl. No.: 15/638,556

(22) Filed: Jun. 30, 2017

(65) Prior Publication Data
US 2019/0007450 A1    Jan. 3, 2019

(51) Int. Cl.
G06F 21/55     (2013.01)
H04L 29/06     (2006.01)
H04L 29/12     (2006.01)

(52) U.S. Cl.
CPC ........ H04L 63/1475 (2013.01); G06F 21/554 (2013.01); H04L 61/103 (2013.01); H04L 61/1511 (2013.01); H04L 61/6022 (2013.01); H04L 63/1408 (2013.01); H04L 63/1425 (2013.01); H04L 61/6009 (2013.01); H04L 63/14 (2013.01); H04L 63/1491 (2013.01)

(58) Field of Classification Search
CPC . H04L 63/14; H04L 63/1475; H04L 63/1408; G06F 21/554
USPC .......................................................... 726/22
See application file for complete search history.

(56) References Cited

U.S. PATENT DOCUMENTS

| 6,735,629 | B1* | 5/2004 | Cafarelli, III | ........... H04L 43/12 709/223 |
| 7,360,245 | B1* | 4/2008 | Ramachandran | ... H04L 63/1466 713/153 |
| 8,341,286 | B1* | 12/2012 | Craft | ..................... H04L 67/141 709/232 |
| 9,178,807 | B1* | 11/2015 | Chua | ....................... H04L 45/02 |
| 9,596,253 | B2* | 3/2017 | Chauhan | .............. H04L 63/1425 |
| 9,747,447 | B2* | 8/2017 | El-Moussa | ............ G06F 21/554 |
| 9,756,061 | B1* | 9/2017 | Roeh | ................... H04L 63/0245 |
| 9,838,512 | B2* | 12/2017 | Shcherbakov | .......... H04L 67/10 |
| 9,894,036 | B2* | 2/2018 | Weinberger | ......... H04L 63/1408 |
| 10,277,618 | B1* | 4/2019 | Wu | ....................... H04L 63/1416 |
| 2004/0111640 | A1* | 6/2004 | Baum | ................. H04L 63/1408 726/13 |
| 2007/0157306 | A1* | 7/2007 | Elrod | .................. H04L 63/0227 726/14 |
| 2009/0327487 | A1* | 12/2009 | Olson | ............... H04L 29/12066 709/224 |
| 2012/0179801 | A1* | 7/2012 | Luna | ................... H04L 61/1511 709/223 |
| 2014/0269777 | A1* | 9/2014 | Rothstein | ............ H04L 43/0823 370/503 |
| 2015/0106889 | A1* | 4/2015 | Sharabani | ............... H04L 63/08 726/5 |

(Continued)

Primary Examiner — Dereena T Cattungal

(57) ABSTRACT

Methods and systems for detecting passive malicious network-mapping software on a computer network are disclosed. An expected location within a computer system for storing a received data packet may be determined. An actual storage location of the received data packet may be identified and compared to the expected storage location. In the event that the expected location does not match the actual storage location of the received data packet on the computer system, the presence of passive malicious network-mapping software such as a sniffer may be detected.

17 Claims, 6 Drawing Sheets

(56) References Cited

U.S. PATENT DOCUMENTS

| | | | |
|---|---|---|---|
| 2016/0055337 A1* | 2/2016 | El-Moussa | G06F 21/566 |
| | | | 726/23 |
| 2016/0359709 A1* | 12/2016 | Deen | G06F 16/173 |
| 2017/0099312 A1* | 4/2017 | Ganame | H04L 63/1425 |
| 2017/0111389 A1* | 4/2017 | Kasman | H04L 63/1458 |
| 2017/0142144 A1* | 5/2017 | Weinberger | H04L 63/0236 |
| 2018/0309775 A1* | 10/2018 | Zou | H04L 63/1416 |

* cited by examiner

DETECTION OF NETWORK SNIFFING ACTIVITY

BACKGROUND

Some attacks on computer networks involve passive mapping of the network. A packet sniffer is one example of malicious software which may be used to passively eavesdrop on the network traffic. In a typical scenario, malicious software penetrates the network, and passively operates a sniffer which can monitor network traffic. They are often difficult to detect because of their passive mode (sometimes referred to as "promiscuous mode" or "monitor mode") of operation.

An undetected sniffer operating on a network, however, may have an ability to significantly impact operations and to also cause security disruptions and/or financial loss. Sensitive internal traffic may be exposed to a sniffer, which can facilitate further breach into a network and/or computer systems on the network.

SUMMARY OF THE DISCLOSURE

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the subject matter disclosed herein. The following merely presents some of the concepts of the disclosure as a prelude to the more detailed description provided thereafter.

One embodiment of the present disclosure relates to a method which includes, in a computer network that comprises multiple endpoints, configuring a network element to forward one or more specified packets to a selected endpoint, and identifying the presence of a sniffer running on the selected endpoint by analyzing storage of the forwarded packet in the selected endpoint.

Another embodiment of the present disclosure relates to a computer system comprising a non-transitory memory storing instructions and one or more hardware processors coupled to the non-transitory memory and configured to read instructions from the non-transitory memory to cause the system to perform operations comprising: receiving, by a network interface card (NIC), one or more bytes of data; determining an expected network data storing component of the computer system responsible for storing the one or more bytes of data received by the NIC; scanning the computer system to identify one or more portions of the computer system storing the one or more bytes of data received by the NIC; and responsive to detecting, based on the scanning, that the one or more bytes of data received by the NIC are stored by a portion of the computer system other than the expected network data storing component determined to be responsible for storing the one or more bytes, generating a notification indicating a security risk.

Yet another embodiment of the present disclosure relates to a tangible, non-transitory computer readable medium storing machine readable instructions that, when executed by one or more processors, cause the one or more processors to perform operations comprising: forwarding a request to an external application; receiving a response from the external application; determining an expected destination for storing the received response data; monitoring the received response to determine the actual storage destination of the received response data; and determining a presence of a sniffer based on a comparison result between the expected destination and the actual storage destination of the received response data.

Further scope of applicability of the methods and systems of the present disclosure will become apparent from the more detailed descriptions given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
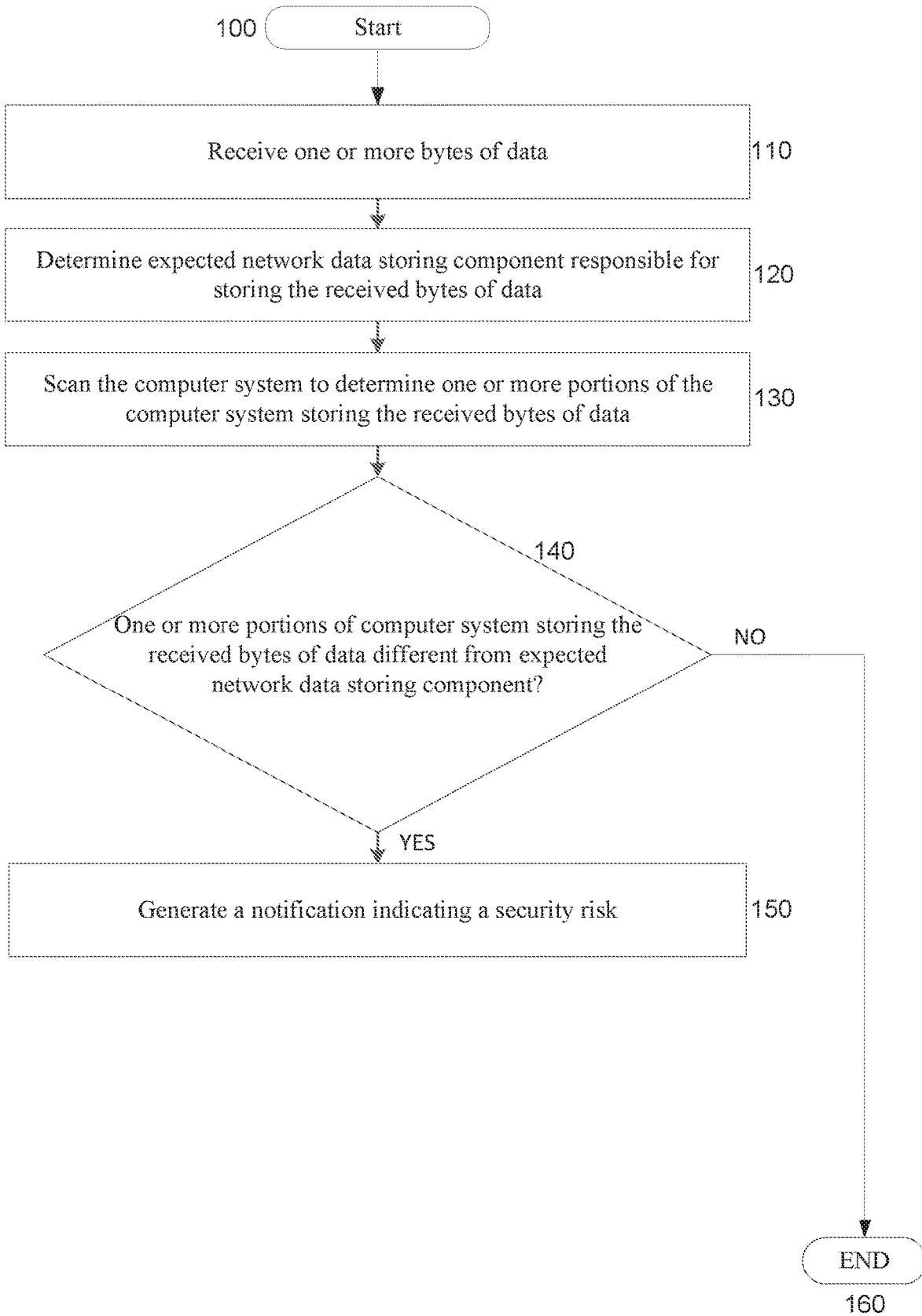
FIG. 1 is an example of generating a notification indicating the presence of a security risk according to a disclosed implementation.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Reference will now be made in detail to the exemplary embodiments of the disclosure, examples of which are illustrated in the accompanying drawings. Wherever possible, the same reference numbers will be used throughout the drawings to refer to the same or like parts.

A sniffer is a program that eavesdrops on the network traffic by grabbing information over a network. Most networks use broadcast technology wherein messages for one computer can be read by another computer on that network, while all the other computers on the network except the one for which the message is meant, will ignore that message. However, sniffers can make computers to accept messages even if they are not intended for them.

One method of detecting sniffers in a computer network is to send a ping request with the IP (internet protocol) or any other Layer 3 protocol address of the suspected machine but without its MAC (media access control) or any other Layer 2 protocol address. Ideally, none of the machines on the network would see the ping request because each of the Ethernet Adapters would reject it as it does not match its MAC address. However, if the suspected machine is indeed running a sniffer, it will respond to the ping request because it does not bother rejecting data packets with a different Destination MAC address. However, with increased sophistication in the design of malicious software, this method is no longer reliable. In various embodiments described below, techniques are provided for reliably detecting the presence of a sniffer on a computer network.

In general, in various embodiments, it may be the case that certain incoming network data should only be stored by one particular portion of computer software and/or stored in only one particular location. By way of example, an address resolution protocol (ARP) cache is a table in computer memory that maps a limited number of IP addresses to their physical adapter addresses. A computer's ARP cache contains its own entry, entries for machines that may have made ARP broadcasts to it, and entries for machines to which it has made broadcasts. A typical system may not have two different legitimate ARP caches, and thus, it may be unnecessary to store ARP data in more than one location—thus, the presence of ARP data in a location other than the ARP cache can indicate sniffer activity.

FIG. 1 is a block diagram that illustrates one exemplary method of detecting the presence of a sniffer on a computer on a network. At step 110, one or more bytes of data are received by a network interface card (NIC) of a computer system. The architecture of the computer system is described in more detail below with reference to FIGS. 5 and 6. According to one embodiment, the one or more bytes of data received by the NIC comprise address resolution protocol (ARP) data. In accordance with another exemplary embodiment, the one or more bytes of data received by the NIC comprise data name system (DNS) data. A person skilled in the art will understand that various other types of data bytes may be used to implement the following method. For instance, data relating to a host name resolution such as NetBIOS name may be used in an alternative embodiment.

At step 120, an expected network data storing component of the computer system responsible for storing the received data is determined. By way of example, an embodiment in which ARP data is received by the NIC is described below to help illustrate the operation at step 120. ARP data is usually formatted to include a field describing the type of message (i.e., its operational code) and information on both layer two and layer three addresses. In order to support addresses that may be of varying length, the ARP data format specifies the type of protocol used at both layer two and layer three and the length of addresses used at each of these layers. The computer system, upon receiving the ARP data, typically saves the ARP data in an ARP cache based on the header information of the ARP message. In other words, in the embodiment in which ARP data is received by the NIC, the ARP cache is determined to be the expected network data storing component of the computer system responsible for storing the received ARP data.

According to an embodiment of the present disclosure, the expected network data storing component of the computer system maybe the operating system of the computer system. In an embodiment, the expected network data storing component of the computer system may be a processing memory of the computer system, such as a RAM to which the CPU has access. In another embodiment, where the one or more bytes of data received by the NIC comprise DNS data, the expected network data storing component determined to be responsible for storing the DNS data comprises a DNS cache. That is, the computer system, upon receiving the DNS data, determines that the DNS data should be saved only in a DNS cache.

At step 130, the computer system is scanned to identify the one or more portions of the computer system that stored the one or more bytes of data received by the NIC. According to an embodiment in which ARP data is received by the NIC, the scanning the computer system at step 130 may involve scanning the computer memory to identify one or more portions storing the ARP data. For instance, the computer memory may be searched 28 bytes at a time (typical length of an ARP message) to determine any and all instances of the ARP data being stored on the computer memory. A person possessing ordinary skill in the art would understand that various memory scanning methods may be used to identify portions of the computer system storing the one or more bytes of data received by the NIC. In the embodiment in which DNS data is received by the NIC, the scanning the computer system at step 130 may involve scanning the computer memory to identify one or more portions storing the DNS data.

At step 140, the identified portions of the computer system that stores the one or more bytes of data received by the NIC is compared to the expected network data storing component of the computer system. In the event, that the identified portions of the computer system are identical to the expected network data storing component of the computer system, the method proceeds to step 150, and the processing ends. The computer system is determined to be clear of any sniffers in this example.

However, in the event that the identified portions of the computer system are not identical to the expected network data storing component of the computer system, the method proceeds to step 150, and a notification indicating a security risk may be generated and displayed on a display screen. For instance, in the event that it is determined, based on the scanning, that the ARP data is stored by a portion of the computer system other than ARP cache, the notification indicating the security risk is generated. Similarly in another embodiment, if it is determined, based on the scanning, that the DNS data is stored by a portion of the computer system other than the DNS cache, the notification indicating the security risk is generated.

This is because, as discussed above, a typical computer system may not have two different legitimate ARP caches, and thus, it may be unnecessary to store ARP data in more than one location—thus, the presence of ARP data in a different location from the ARP cache can indicate sniffer activity. Similarly, a typical computer system may not have two different legitimate DNS caches, and the presence of DNS data in a location other than the DNS cache can indicate sniffer activity.

Figure 2:
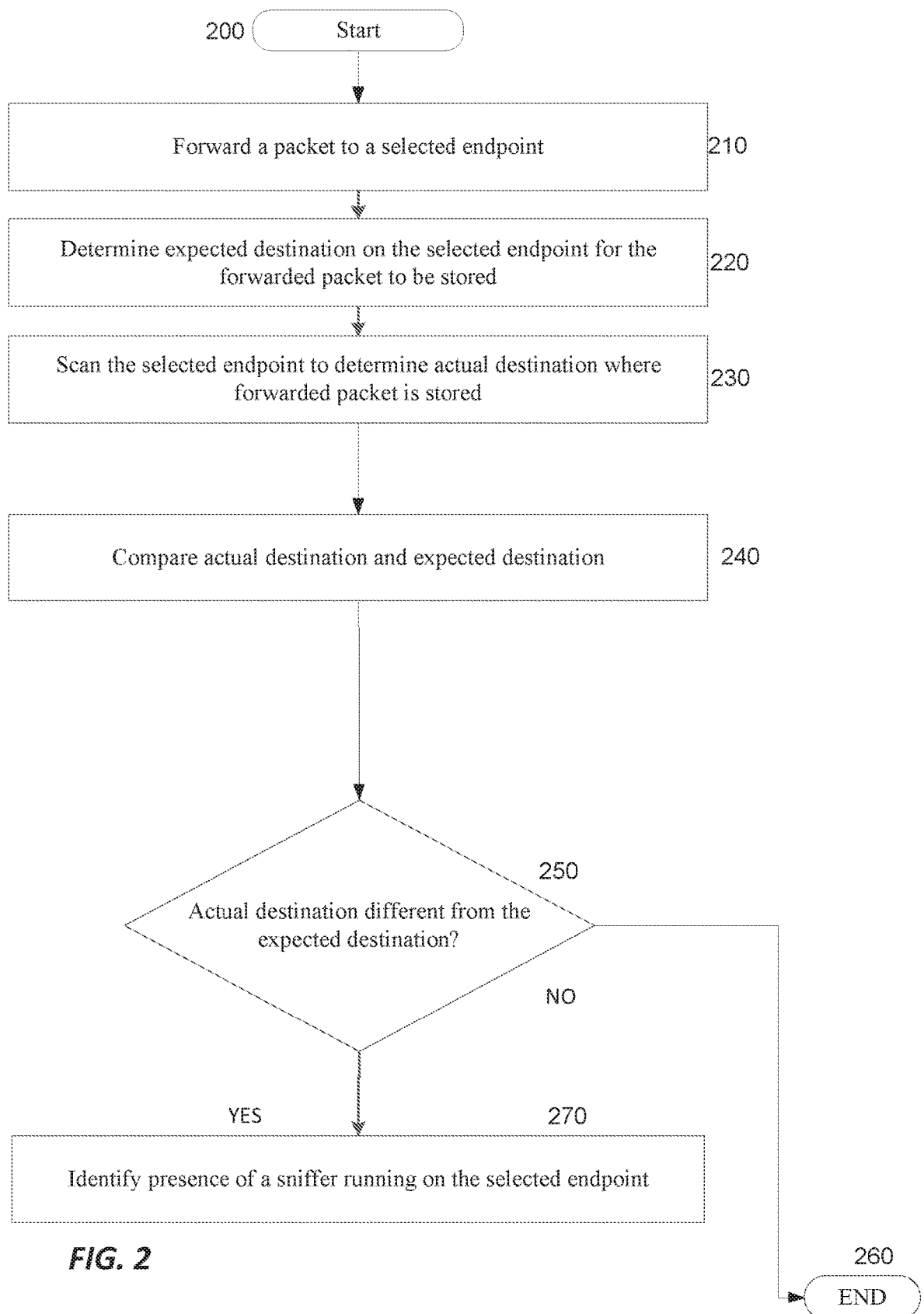
FIG. 2 is an example method of detecting the presence of a sniffer according to a disclosed implementation.

FIG. 2 is a block diagram illustrating another exemplary method of detecting the presence of a sniffer running on a selected endpoint on a computer network. At step 210, a specified data packet is forwarded to the selected endpoint. The architecture of the selected endpoint is described in more detail below with reference to FIGS. 5 and 6. According to one embodiment, the data packet forwarded to the selected endpoint comprises address resolution protocol (ARP) data. In accordance with another exemplary embodiment, the forwarded data packet received by the selected endpoint comprises data name system (DNS) data. A person skilled in the art will appreciate that any type of data packet may be forwarded to the selected endpoint and is not limited to the described embodiments above.

At step 220, an expected destination within the selected endpoint where the forwarded packet is to be stored is determined. In an embodiment in which ARP data is forwarded to the selected endpoint, an ARP cache within the selected endpoint is determined to the expected destination where the ARP data is to be stored. A person skilled in the art will understand that such a determination may be dependent on the specific data packet forwarded to the selected endpoint. In the above embodiment, the ARP cache may be identified as the expected destination based on header information included in the ARP data as part of the forwarded packet.

In an embodiment, the expected destination of the selected endpoint may be a processing memory of the computer system, such as a RAM to which the CPU has access. In an embodiment, where the forwarded packet received by the selected endpoint comprises ARP data, the expected destination for storing the ARP data is an ARP cache. In another embodiment, where the forwarded packet received by the selected endpoint comprises DNS data, the expected destination for storing the DNS data is a DNS cache. In the above embodiment, the DNS cache may be identified as the expected destination based on header information included in the DNS data as part of the forwarded packet.

At step 230, the selected endpoint is scanned to identify the actual destination within the selected endpoint where the forwarded packet is stored. As discussed above with reference to FIG. 1, the scanning the computer system at step 230 may involve scanning the selected endpoint to identify one or more destinations where the forwarded packet is stored. For instance, in the embodiment in which the forwarded packet comprises ARP data, the memory of the selected endpoint may be searched 28 bytes at a time (typical length of an ARP message) to determine any and all instances of the ARP data being stored on the selected endpoint. A person possessing ordinary skill in the art would understand that various memory scanning methods may be used to identify destinations within the selected endpoint storing the forwarded packet.

At step 240, the actual destination (from step 230) is compared to the expected destination (from step 220). In the event, that the actual destination where the forwarded packet is stored on the selected endpoint is identical to the expected destination, the method proceeds to step 260, and the processing ends. The selected endpoint is determined to be clear of any sniffers in this instance.

However, in the event that the actual destination where the forwarded packet is stored on the selected endpoint is different from the expected destination, the method proceeds to step 270 and the presence of a sniffer running on the selected endpoint is identified. For instance, in the event that it is determined, based on the scanning, that the ARP data is stored on the selected endpoint at a destination other than ARP cache, that selected endpoint likely has a sniffer running on it. Similarly in another embodiment, if it is determined that the DNS data is stored on the selected endpoint at a destination other than DNS cache, the selected endpoint is determined to have a sniffer running on it.

This is because, in some specific instances, certain incoming network data packet should only be stored by one particular destination within the selected endpoint. Thus, the presence of such incoming network data packet at more than one destination within the selected endpoint can indicate the presence of a sniffer.

Figure 3:
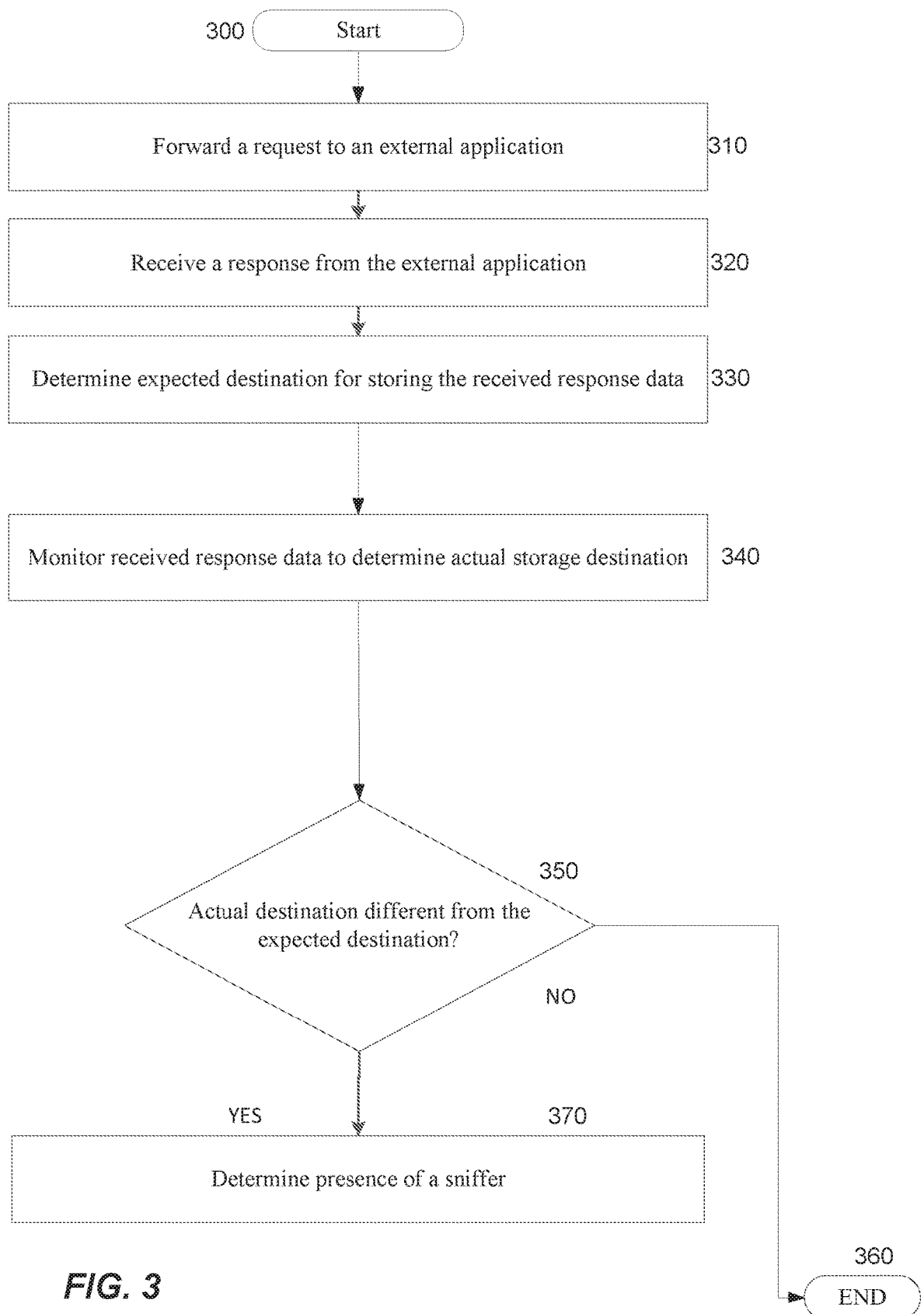
FIG. 3 is an example method of detecting the presence of a sniffer according to a disclosed implementation.

FIG. 3 is a block diagram illustrating another exemplary method of detecting the presence of a sniffer. At step 310, a request is forwarded to an external application. According to one embodiment, the external application comprises a web server application. Specifically, a user agent such as a web browser on a computer initiates communication with the web server by making a request for a specific resource such as a web page or an image. The requested specific resource, according to an embodiment, may be a real file stored on the web server's secondary storage. A person skilled in the art will understand that various other external applications may be used instead of a web server application to carry out the steps of the method described here.

At step 320, the external application transmits a response to the request. In the embodiment described above, the web server responds with the content of the requested resource. For instance, the response from the web server may be a web page or images. At step 330, an expected destination for storing the received response data is determined. For instance, in the embodiment described above, the content of the requested resource (i.e., web pages or images) would typically be stored in a web cache. Web caches reduce the amount of information that needs to be transmitted across the network, as information previously stored in the web cache may be re-used. Therefore, the web cache is determined to be the expected destination for storing the received response data.

In an embodiment, the expected destination for storing the received response data is determined by monitoring the storage location of the received response data for a predetermined number of received responses from the external application. For instance, in an embodiment, a preset number of requests (e.g., 1000) are sent to the web server by the web browser. The storage destination of the received responses is monitored to determine the expected destination for storing the received response data. More specifically, the storage destination of the received responses is monitored to establish a pattern, any deviation from which can indicate the presence of a sniffer.

According to an embodiment, the preset number of requests sent to the web server corresponds to the number of times the user agent such as the web browser on a computer initiates communication with the web server. A person skilled in the art will understand that any number of such requests may be sufficient to determine the expected destination for storing the received response data on the computer.

At step 340, the actual destination where the received response data is stored is determined. The actual destination where the received response data is stored may be determined via methods similar to those described above with respect to the embodiments illustrated in FIGS. 1 and 2. At step 350, the actual destination (from step 340) is compared to the expected destination (from step 330). In the event, that the actual destination where the received response data is stored is identical to the expected destination, the method proceeds to step 360, and the processing ends.

However, in the event that the actual destination where the received response data is stored is different from the expected destination, the method proceeds to step 370 and the presence of a sniffer is identified. For instance, in the event that it is determined that the received content from the web server is stored at a location other than the web cache, it is determined that a sniffer is likely present. In a typical system, there is no reason for the received content from the web server to be stored at a location different from the web cache. Therefore, presence of the received content from the web server at a location other than the web cache can indicate the presence of sniffer activity.

In the embodiment in which the expected destination for storing the received response data is determined by monitoring the storage location of the received response data for a predetermined number of received responses, a deviation from the storage location of the received response data for the predetermined number of received responses can indicate the presence of sniffer activity. More specifically, in a typical computer system, once a storage location has been established as the expected destination for storing the received response data based on the monitored behavior over a period of time, any future deviation in the storage location would likely be caused only by the presence of a sniffer.

A person skilled in the art would appreciate that the above description is merely intended to serve as an example of an external application, and data from various other external applications may be used to determine the presence of a sniffer. Therefore, specific bytes coming from the network card (NIC) and their eventual destination may be monitored to determine that the specific bytes are only being stored by processes that are responsible for storing them.

Figure 4:
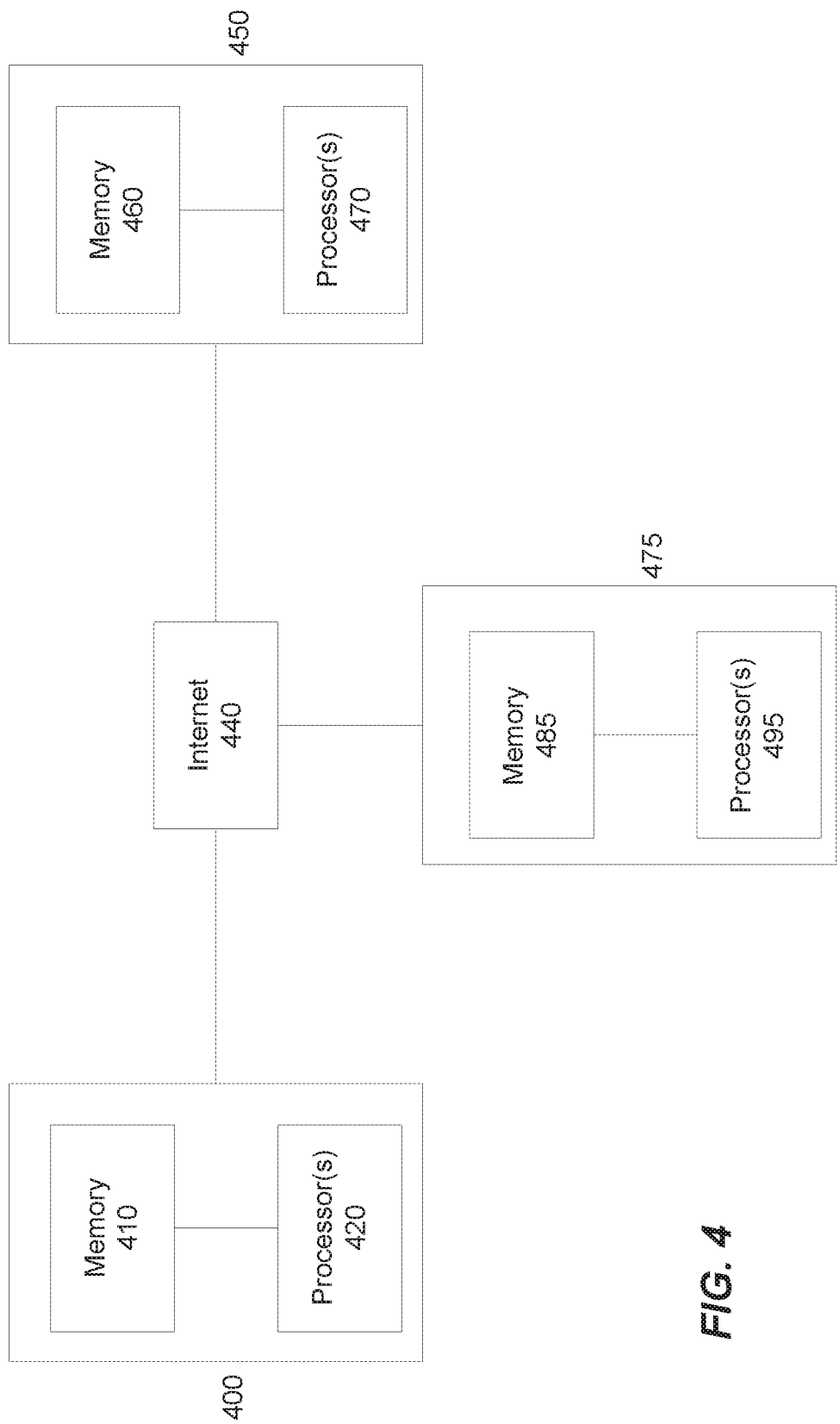
FIG. 4 is an example network configuration of a system according to an implementation disclosed herein.

FIG. 4 is an example configuration of a computer network according to an implementation disclosed in that includes multiple endpoints 400, 450, 475. Although the embodiment shown in FIG. 4 illustrates three endpoints as part of the computer network, a person skilled in the art will appreciate that any number of endpoints may be added or subtracted from the computer network. Each of the endpoints 400, 450, 475 include a respective memory 410, 460, 485, and one or more hardware processors 420, 470, 495. The components may be integrated into a single device as illustrated here, or be in separate devices. The memory 410, 460, 485 may be a non-transitory memory that can store information about one or more expected destinations where the received bytes of data are to be stored. Memory 410, 460, 485 may also refer to a database that is connected to the endpoints 400, 450, 475.

The one or more hardware processors 420, 470, 495 may be coupled to the memory 410, 460, 485 and configured to read instructions from the memory 410, 460, 485 to cause the system to perform any of the operations previously described, including those in FIGS. 1-3. The system may be connected to each other via an internet connection 440. The connected may be a wired connection (Ethernet protocol) and/or a wireless connection.

Figure 5:
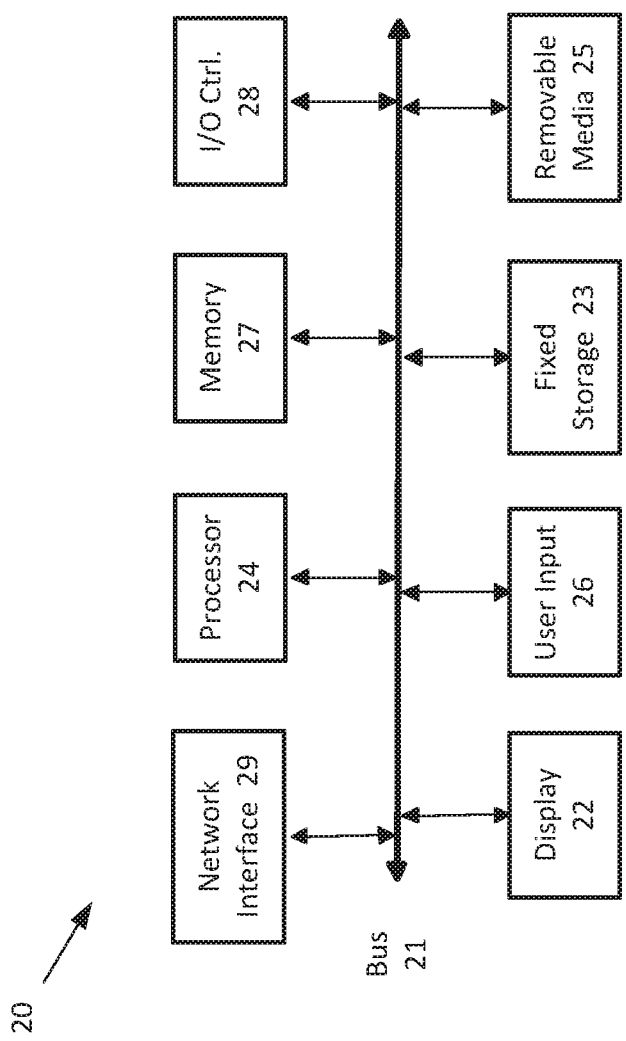
FIG. 5 is an example computer suitable for implementing embodiments of the presently disclosed subject matter.

Embodiments of the presently disclosed subject matter may be implemented in and used with a variety of component and network architectures. FIG. 5 is an example computer 20 (e.g., electronic device such as a server, desktop computer, laptop, etc.) suitable for implementing embodiments of the presently disclosed subject matter. The computer 20 includes a bus 21 which interconnects major components of the computer 20, such as a central processor (CPU) 24, a memory 27 (typically RAM, but which may also include read-only memory ("ROM"), flash ROM, or the like), an input/output controller 28, a user display 22, such as a display screen via a display adapter, a user interface 26, which may include one or more controllers and associated user input devices such as a keyboard, mouse, and the like, and may be closely coupled to the I/O controller 28, fixed storage 23, such as a hard drive, flash storage, Fiber Channel network, SAN device, SCSI device, and the like, and a removable media component 25 operative to control and receive an optical disk, flash drive, and the like. Memory 27 may also refer to machine readable storage such as a database. In the implementations disclosed above, a variety of data may be stored in short term and/or long term memory.

The bus 21 allows data communication between the central processor 24 and the memory 27, which may include ROM or flash memory (neither shown), and RAM (not shown), as previously noted. The RAM is generally the main memory into which the operating system and application are loaded. The ROM or flash memory can contain, among other code, the BASIC Input/output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other techniques. The network interface 29 may provide such connection using wireless techniques, digital satellite data connection or the like. For example, the network interface 29 may allow the computer to communicate with other computers via one or more local, wide-area, or other networks. Many other devices or components (not shown) may be connected in a similar manner (e.g., hard disk drives, displays, etc.). Conversely, all of the components shown in FIG. 5 need not be present to practice the present disclosure. The components can be interconnected in different ways from that shown. The operation of a computer such as that shown in FIG. 5 is readily known in the art and is discussed in detail in this application. Code to implement the present disclosure can be stored in computer-readable storage media such as one or more of the memory 27, fixed storage 23, removable media 25, or a remote storage location. The code may be instructions executable to cause a machine to perform operations of the disclosed implementations such as the examples provided in FIGS. 1-4. The code may be stored on non-transitory machine-readable medium.

Figure 6:
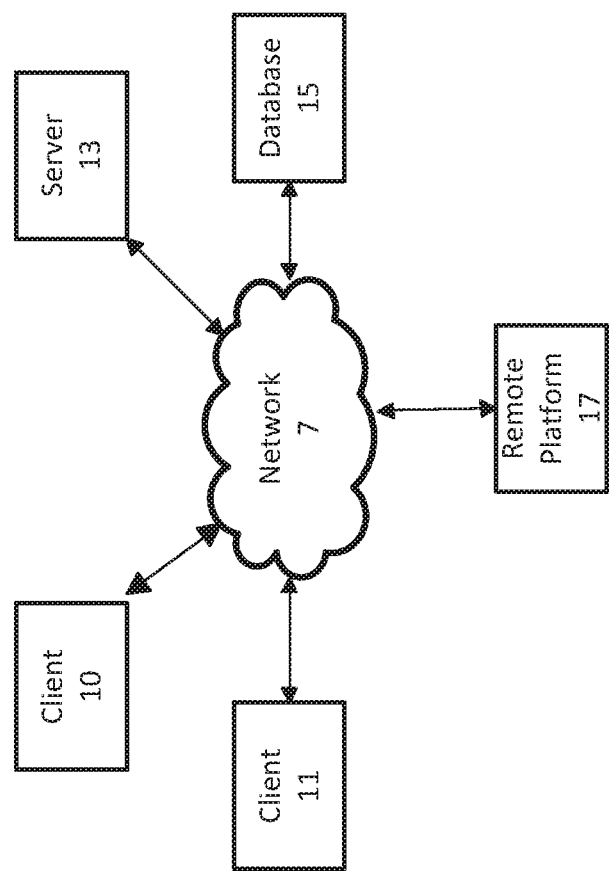
FIG. 6 shows an example network arrangement according to an embodiment of the presently disclosed subject matter.

FIG. 6 shows an example network arrangement according to an embodiment of the disclosed subject matter. One or more clients 10, 11, such as local computers, or virtual machines, and the like may connect to other devices via one or more networks 7. The network may be a local area network, wide-area network, the Internet, or any other suitable platform including wired and/or wireless networks. The clients may communication with one or more servers 13, and/or databases 15. The device may be directly accessible by the clients 10, 11, or more other devices may provide intermediary access such as where a server 13 provides access to resources stored in a database 15. The clients 10, 11, also may access remote platforms 17 or services provided by remote platforms 17 such as cloud computing arrangements and services. The remote platform 17 may include one or more servers 13 and/or databases 15. In some configurations, at least one of the clients 10, 11 and/or server 13 may perform the operations disclosed herein.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and/or executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk, or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to use those embodiments as well as various embodiments with various modifications as may be suited to the particular use contemplated.

What is claimed is:

1. A computer system, comprising:
   a network interface card (NIC);
   at least one processor; and
   a non-transitory, computer-readable medium having instructions stored thereon that are executable by the at least one processor to cause the computer system to perform operations, the operations comprising:
   receiving first data via the NIC;
   determining, based on a type of the first data, an expected storage location, of the computer system, for storing the first data, wherein the first data includes at least one of the following types of data:
   address resolution protocol (ARP) data;
   domain name system (DNS) data;
   host name data; or
   web resource data;
   identifying an actual storage location, of the computer system, in which the first data is stored;
   comparing the expected storage location for the first data to the actual storage location for the first data;
   based on the comparing, determining that the actual storage location for the first data does not match the expected storage location for the first data; and
   in response to the determining that the actual storage location does not match the expected storage location, generating a notification indicating a security risk.

2. The computer system of claim 1, wherein the first data includes ARP data; and wherein the expected storage location for the ARP data is an ARP cache.

3. The computer system of claim 2, wherein the determining includes determining that the ARP data is stored by a portion of the computer system other than the ARP cache.

4. The computer system of claim 1, wherein the expected storage location for the first data is a system memory of the computer system.

5. The computer system of claim 1, wherein the first data includes DNS data; and wherein the expected storage location for the DNS data is a DNS cache.

6. The computer system of claim 5, wherein the determining includes determining that the DNS data is stored by a portion of the computer system other than the DNS cache.

7. A method, comprising:
receiving, by a computer system, first data;
determining, by the computer system based on a type of the first data, an expected storage location for storing the first data, wherein the first data includes at least one of the following types of data:
ARP data;
DNS data;
host name data; or
web resource data;
identifying, by the computer system, an actual storage location in which the first data is stored;
comparing, by the computer system, the expected storage location for the first data to the actual storage location for the first data;
based on the comparing, determining, by the computer system, that the actual storage location for the first data does not match the expected storage location for the first data; and
in response to the determining that the actual storage location does not match the expected storage location, generating, by the computer system, a notification indicating a security risk.

8. The method of claim 7, wherein the first data includes ARP data, and wherein the expected storage location for the ARP data is an ARP cache.

9. The method of claim 8, wherein the determining includes determining that the ARP data is stored by a portion of the computer system other than the ARP cache.

10. The method of claim 7, wherein the expected storage location for the first data is a system memory of the computer system.

11. The method of claim 7, wherein the first data includes DNS data, and wherein the expected storage location for the DNS data is a DNS cache.

12. The method of claim 11, wherein the determining includes determining that the DNS data is stored by a portion of the computer system other than the DNS cache.

13. A non-transitory, computer-readable medium having instructions stored thereon that are executable by a computer system to perform operations comprising:
receiving first data via a NIC;
determining, based on a type of the first data, an expected storage location, of the computer system, for storing the first data, wherein the first data includes at least one of the following types of data:
ARP data;
DNS data;
host name data; or
web resource data;
identifying an actual storage location, of the computer system, in which the first data is stored;
comparing the expected storage location for the first data to the actual storage location for the first data;
based on the comparing, determining that the actual storage location for the first data does not match the expected storage location for the first data; and
in response to the determining that the actual storage location does not match the expected storage location, generating a notification indicating a security risk.

14. The non-transitory, computer-readable medium of claim 13, wherein the first data includes ARP data, and wherein the expected storage location for the ARP data is an ARP cache.

15. The non-transitory, computer-readable medium of claim 14, wherein the determining includes determining that the ARP data is stored by a portion of the computer system other than the ARP cache.

16. The non-transitory, computer-readable medium of claim 13, wherein the expected storage location for the first data is a system memory of the computer system.

17. The non-transitory, computer-readable medium of claim 13, wherein the first data includes DNS data, and wherein the expected storage location for the DNS data is a DNS cache.

* * * * *